(12) United States Patent
Patton et al.

(10) Patent No.: US 7,895,074 B2
(45) Date of Patent: *Feb. 22, 2011

(54) PROMOTIONAL MATERIALS WITHIN DIGITAL CINEMA DATA STREAM

(75) Inventors: David L. Patton, Webster, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1505 days.

This patent is subject to a terminal disclaimer.

(21) Appl. No.: 10/924,613

(22) Filed: Aug. 24, 2004

(65) Prior Publication Data

US 2006/0059039 A1    Mar. 16, 2006

(51) Int. Cl.
*G06Q 30/00* (2006.01)
(52) U.S. Cl. .................. 705/14.37; 705/26.1; 705/26.5; 705/26.63
(58) Field of Classification Search .............. 705/14.37, 705/26.1, 26.5, 26.63; 382/100, 284; 345/629

See application file for complete search history.

(56) References Cited

U.S. PATENT DOCUMENTS

| 6,065,042 A | 5/2000 | Reimer et al. |
| 2004/0172325 A1* | 9/2004 | Blanco et al. ................. 705/14 |

OTHER PUBLICATIONS

U.S. Appl. No. 10/401,923, filed Mar. 28, 2003, David L. Patton et al.
U.S. Appl. No. 10/402,084, filed Mar. 28, 2003, John R. Fredlund et al.

* cited by examiner

*Primary Examiner*—Raquel Alvarez
(74) *Attorney, Agent, or Firm*—Stephen H Shaw; Kevin E. Spaulding

(57) ABSTRACT

A method that provides a motion picture promotional item using digital data at an exhibition site. The method includes receiving motion picture digital data at the exhibition site; and receiving supplemental data transmitted along with the motion picture digital data, the supplemental data to be used for forming the promotional item. Additionally the method stores the supplemental data in a memory accessible from the exhibition site, and forms the promotional item according to the supplemental data in response to a user command.

28 Claims, 6 Drawing Sheets

PROMOTIONAL MATERIALS WITHIN DIGITAL CINEMA DATA STREAM

FIELD OF THE INVENTION

This invention generally relates to digital cinema and more particularly relates to a method and apparatus for using the digital data stream to promote sales of supplemental movie-related items.

BACKGROUND OF THE INVENTION

With the advent of digital cinema, considerable attention has been directed to potential commercial advantages that become available when using content that is generated and transmitted electronically. For example, digital cinema provides the capability to provide multiple versions of a movie or of movie scenes, as well as the capability to adapt the content of individual scenes based on audience demographics. Because the content of the motion picture and its associated advertising is transmitted electronically, there is additional flexibility for control of content, allowing opportunities for adapting displayed content to local conditions and audience preferences. Other technical advantages will allow more flexible display arrangements as well as opportunity for color enhancement and other imaging improvements. In addition to these technical and performance advantages, there also appear to be considerable advantages and opportunities for more economical motion picture distribution, for improved adaptation to markets and viewer demographics, for local customization of some types of content, and for an overall development of a more engrossing theater experience. Along with these advantages come enhanced opportunities for revenue enhancement both for studios that produce and distribute motion picture content and for theaters that show this content to audiences.

The conventional model for motion picture film distribution is characterized by rigid control of the entire distribution and display process, allowing minimal or no flexibility for local adaptation. Referring to FIG. 1, there is shown a block diagram of a conventional motion picture film distribution system 10. A production studio 20 takes the content from content providers 22 who generate the film feature, advertising, trailers, previews, and other content for theater display, typically as separate content films 30. Studio 20 edits, masters, and prepares print films 24 and provides them, through a distribution network 26 to theaters 28. In the conventional model of FIG. 1, studio 20 dictates what is viewed at each theater 28. This control of what gets shown extends not only to the film feature itself, but also to any advertising or trailers, such as previews for future offerings, and the like. In the conventional arrangement, theaters 28 follow the instructions of studio 20 for display of the film feature and other related content. With the relatively inflexible arrangement shown in FIG. 1, there is no opportunity for dynamically adding or changing image content.

Theater revenues are primarily from admission fees and concession sales, often with some additional revenue from local and national advertisers for material displayed between showings. Theaters, however, have little participation in additional profits from movie-related items. Items that promote the motion picture and its stars include such items as posters, T-shirts, and other accessories. These promotional items are sold by stores and other outlets not related to the theater. Thus, while studios and motion picture distributors enjoy a share of the profits from sales of supplemental promotional items to movie fans, the theater does not derive any direct benefit from these sales.

It is well known that many consumers are more likely to purchase various types of items on impulse, based on experiencing an event such as a motion picture. Theater owners, however, are largely unable to take advantage of the type of consumer enthusiasm that often follows the viewing of a popular motion picture. Among practical obstacles are the cost of inventory, complexities of ordering and inventory management, required floor and storage space, and theft and security considerations. Thus, while it can be appreciated that the capability for offering promotional items to the movie audience would have advantages for movie theater owners, workable schemes for taking advantage of this opportunity have not been developed.

Items promoting a movie, such as posters and banners, are currently provided to the theater owner in printed form. These items can be expensive to ship and may not arrive in sufficient time for advertising an upcoming feature to current customers. Many motion picture fans would have an interest in purchasing movie posters, as provided to the theater or in personalized form. However, using conventional distribution practices, theater owners are not able to print their own posters for display, nor can they take advantage of potential revenues from the sale of these items.

Thus, it can be seen that there is a need for solutions that allow a theater owner to print posters for advertisement and to provide promotional items to audiences in a timely and flexible fashion, without incurring high inventory expenses.

SUMMARY OF THE INVENTION

The aforementioned needs are met addressed with the present invention by providing a method for providing, at an exhibition site, a promotional item related to a showing of a motion picture from digital data, the method comprising the steps of:
  (a) receiving motion picture digital data at the exhibition site;
  (b) receiving supplemental data transmitted along with the motion picture digital data, the supplemental data to be used for forming the promotional item;
  (c) storing the supplemental data in a memory accessible from the exhibition site;
  (d) forming the promotional item according to the supplemental data in response to a user command.

Another aspect of the present invention provides a system for providing a promotional item at a presentation site of a motion picture that includes:
  (a) a receiving logic processor for receiving a motion picture data stream,
  (b) a data storage means for storing motion picture data and for storing supplemental data provided in the motion picture data stream for forming the promotional item;
  (c) a control logic processor for accepting an operator command to form the promotional item; and
  (d) a recording apparatus in communication with the control logic processor for obtaining the supplemental data and for forming the promotional item onto a recordable medium according to the operator command.

Still another aspect of the present invention employs a method for providing, at an exhibition site, a promotional item related to a showing of a motion picture from digital data, including the steps of:
  (a) receiving motion picture digital data at the exhibition site;

(b) receiving supplemental data transmitted along with the motion picture digital data, the supplemental data to be used for forming the promotional item;

(c) storing the supplemental data in a memory accessible from the exhibition site;

(d) forming the promotional item according to the supplemental data in response to a user command; and (e) requesting the promotional item via a kiosk.

A feature of the present invention is the inclusion of promotional data content along with the digital image data stream.

It is an advantage of the present invention that it allows flexibility for preparation of suitable promotional materials at the motion picture theater itself, both for current and upcoming features.

It is a further advantage of the present invention that it allows the theater owner to offer customers a range of promotional items related to a film showing, yet without the need to stock and manage substantial amounts of inventory.

It is yet a further advantage of the present invention that it allows the theater owner to provide promotional items related to a motion picture that can be customized for the individual consumer.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
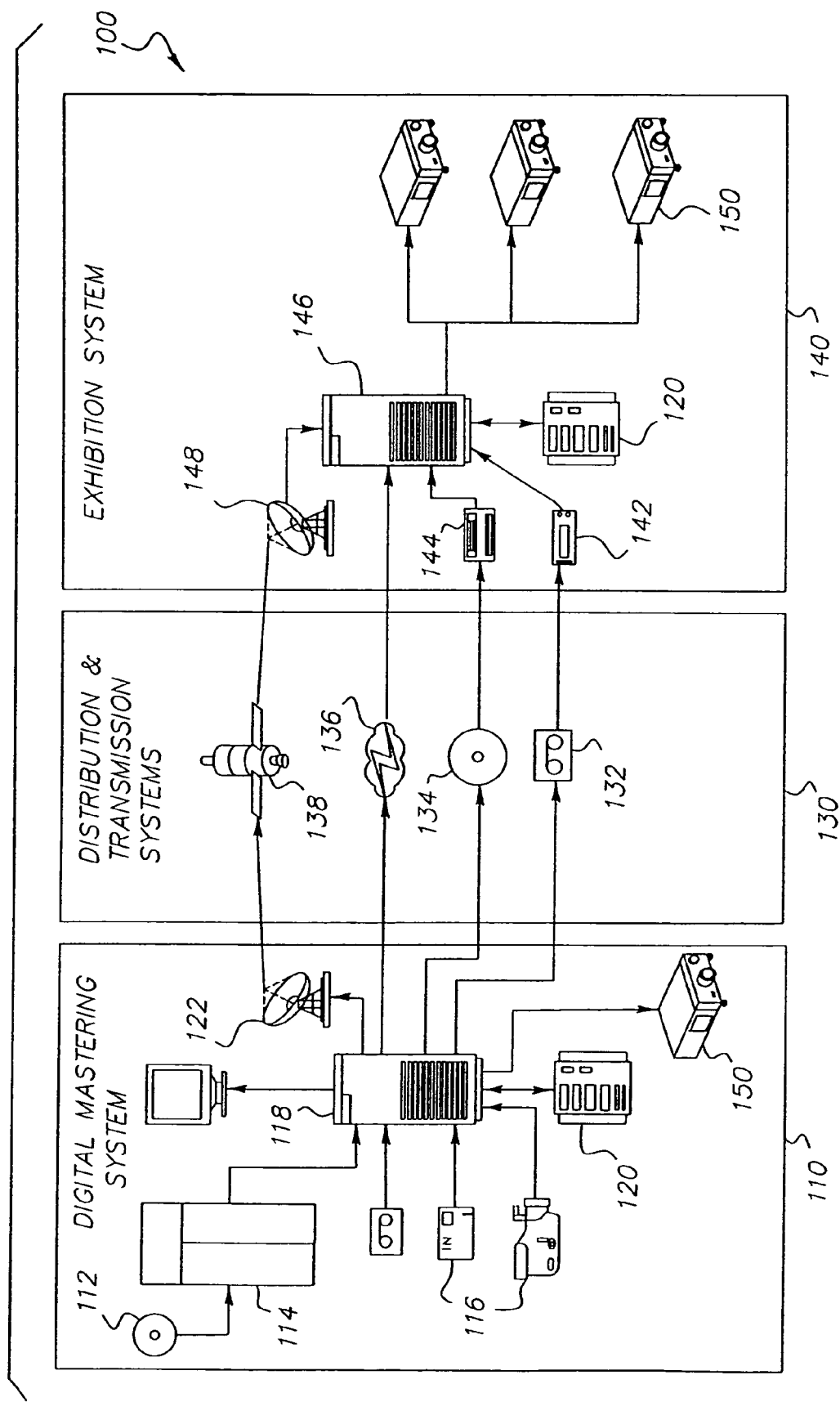
FIG. 2 is a schematic block diagram showing an exemplary system for mastering and providing digital motion picture data for implementing the present invention.

One of the potential benefits of digital cinema relates to how images are stored and displayed from data. Referring to FIG. 2, there is shown a block diagram of a digital cinema preparation and distribution system 100, according to the present invention, for providing motion picture images from a studio 110, over a transmission system 130 to an exhibition system 140, typically a movie theater. The movie theater resides at an exhibition site. The exhibition site includes the lobby, the display screens and projection devices, gaming areas, dining facilities and refreshment stands, and exit/entrance areas and anticipated extended areas proximate to the theater. These areas are well known to those skilled in the art and those that view movies at these exhibition sites. At studio 110, digital mastering is performed on film 112 that contains image content, such as the film feature, advertising, trailers, and the like. A datacine system 114 transforms the film content into digital image content and provides the digital image content to a rendering system 118, typically supported by a disk array 120, that renders the motion picture image data in a resolution suitable for distribution and display. Rendering system 118 may also accept input from auxiliary input devices 116 such as data tape, DS tape, and DataCam devices. The fully mastered digital cinema output then is provided as a data stream to transmission system 130, which may utilize a satellite 138 in communication with a transmitter 122 connected to studio 110 equipment. Other alternative transmission media include a fiber cable connection 136, or transmission using an optical medium 134, such as DVD or optical disks, or using a magnetic medium 132, such as data tape, or using some other type of medium. At exhibition system 140, the mastered digital image data is received, such as at a receiver 148, an optical media reader 144, a magnetic media reader 142 or over a data or fiber optic cable connection 136. A cinema operating system 146, typically supported by disk array 120 or some other mass data storage apparatus using electronic, optical, magnetic, or other types of storage media, accepts the digital input data, processes the input data stream for presentation, and provides this data for image forming and projection by one or more digital projectors 150.

Figure 1:
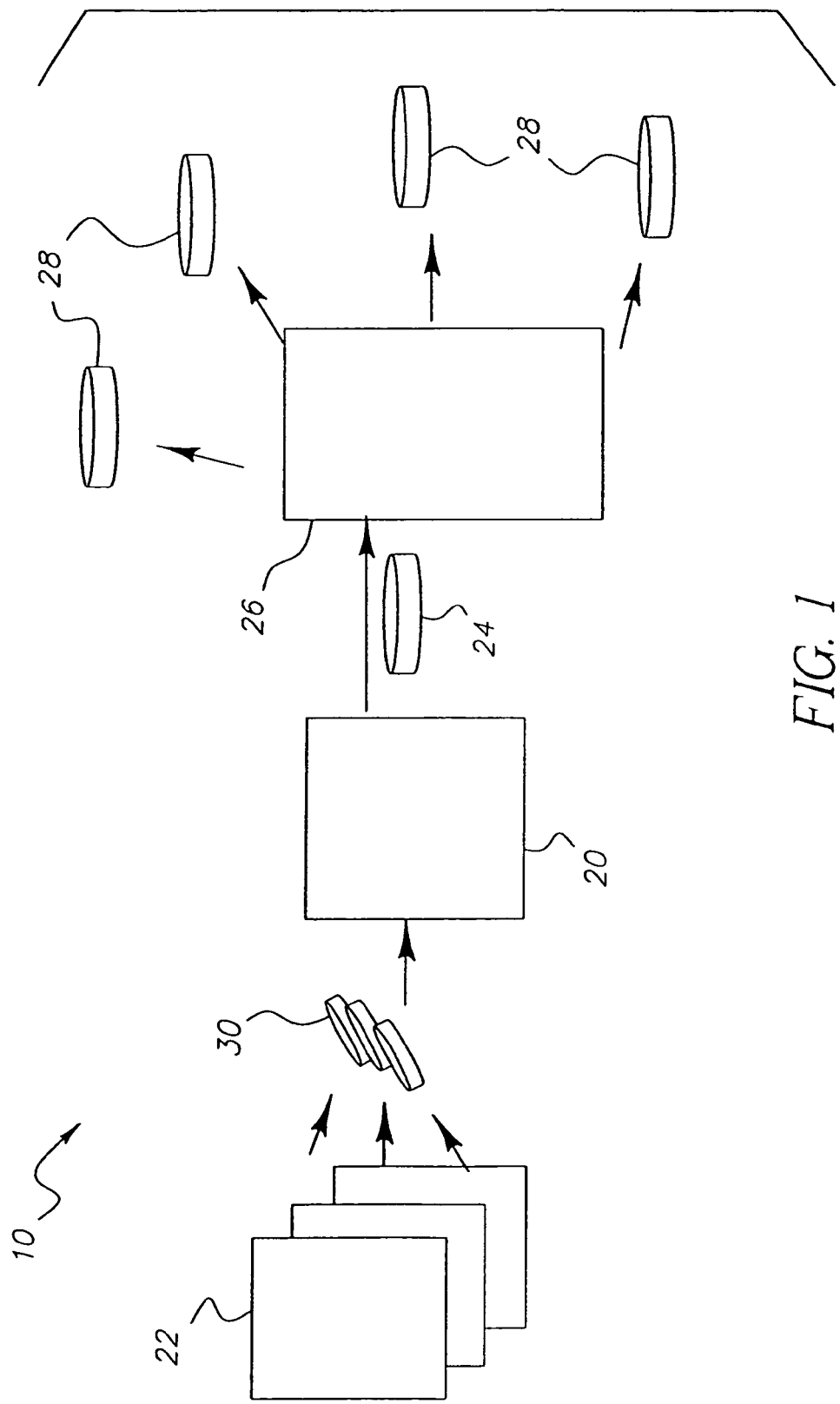
FIG. 1 is a schematic block diagram showing a conventional prior art system for motion picture film preparation and distribution.
Figure 3:
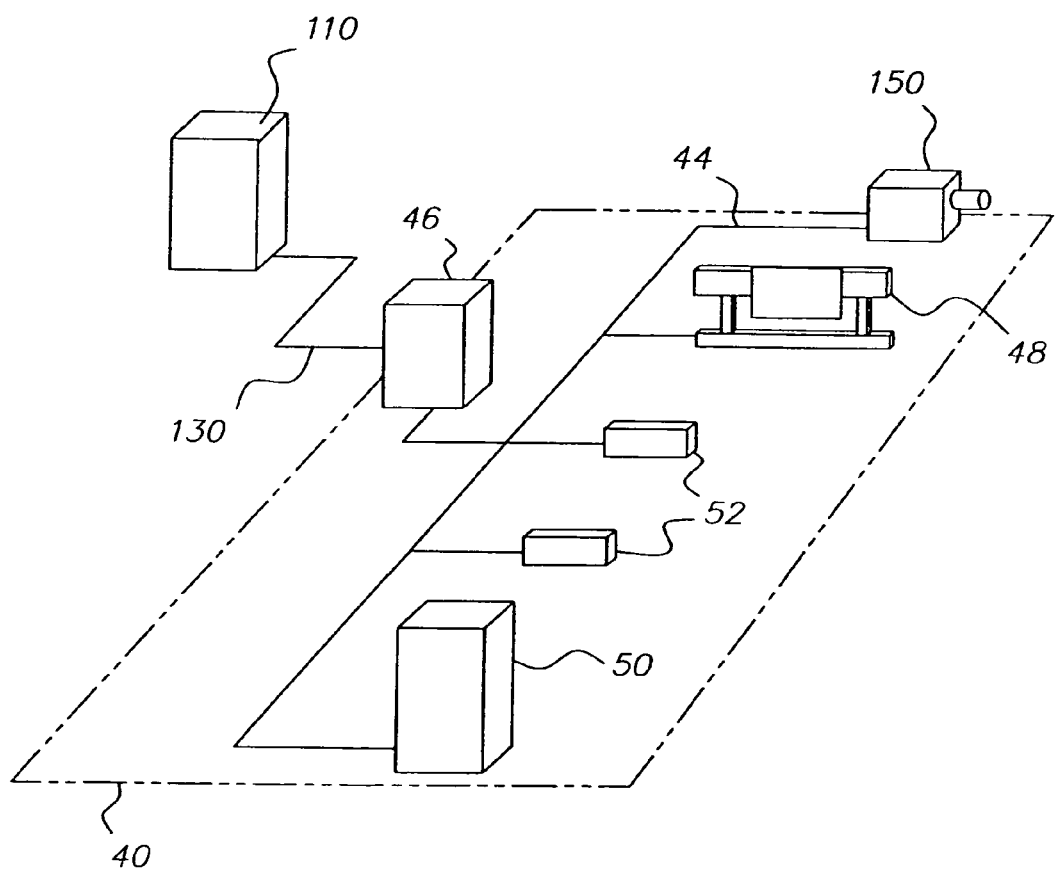
FIG. 3 is a block diagram showing an arrangement of output devices provided for generation of promotional items at a movie theater.

Referring to FIG. 3, there is shown an entertainment system 40 according to the present invention, that is configured at exhibition system 140 of FIG. 2. A control logic processor 46, which may be a separate computer or microcomputer or may be identical with cinema operating system 146, accesses transmitted data that has been provided over transmission system 130 and that is typically stored by means of some mass data storage apparatus, as described hereinabove with reference to FIG. 1. Control logic processor 46 connects along a network 44 to digital projector 150 and to one or more output devices. The output devices are for recording a supplemental portion of the transmitted data onto an item of some type for forming a promotional item. Output devices may include one or more recording apparatus 52, a large-format printer 48, or other devices, including output devices associated with a kiosk 50. The promotional item can be recorded onto any of a number of types of media, including, but not limited to, optical and magnetic media, textiles, paper, ceramics, and plastics, for example.

Large-format printer 48 may be an inkjet, thermal, laser, or other type of printer suited for printing posters and banners, for example. With this capability, a theater owner can print promotional posters on-site. This would allow the theater owner to print and use an appropriate number of posters or banners for a site, depending on available wall space, audience interest, and timing, for example. The theater owner also has the opportunity to print and sell posters to consumers. Even though it may take several minutes to prepare a large-scale print, posters can be printed at the presentation site during idle time, such as during a showing, so that prints are ready for sale at the end of the event. Posters may be standard posters prepared under the control of studio 110 or, optionally, may be customized, such as using kiosk 50 capabilities, described subsequently.

Recording apparatus 52 may be any of a number of different types of devices for providing images, for recording audio data, or for copying software, or for recording image data, for example. A color printer, such as a thermal printer or photographic printer, could be employed to provide 8×10 prints or printed material in other useful formats. Recording apparatus 52 may also be a printer for writing coupons, tickets, or other appropriate materials. Recording apparatus 52 could be a device for recording onto optical media, such as CDs and DVDs for example. This capability would enable the theater owner to provide audio and/or video clips related to the motion picture or to other upcoming attractions. For example, key scenes or music from a film could be available as a promotional item, recorded onto CD or DVD at the site or delivered/transmitted wirelessly as photo messages or text messages that incorporate scene content or supplemental promotional data. One or more trailers or out-takes from existing or upcoming motion pictures could be provided, for printing onto DVD. Video trailers or selected out-takes could be provided for free or at a nominal price, based on promotional needs of a theater or distributor. A trailer, out-take, still images, or other sample segment of a motion picture could be provided at lower resolution, to enable faster printing of DVDs. Similarly, audio clips could be provided at low cost for promoting music associated with the motion picture. The content included can be selected by the user when a user selection function is enabled.

In another embodiment, recording apparatus 52 is a printer equipped for writing onto T-shirts and other types of wearing apparel. Using an apparatus such as a thermal printer or a thermal transfer from an electrophotographic system would enable the consumer to obtain a wearable memento of the motion picture immediately before or after a showing, at the motion picture presentation site itself. Other types of recording apparatus 52 could be employed for writing tattoo materials, coffee mugs, and other types of promotional items.

Data Transmittal

Figure 4:
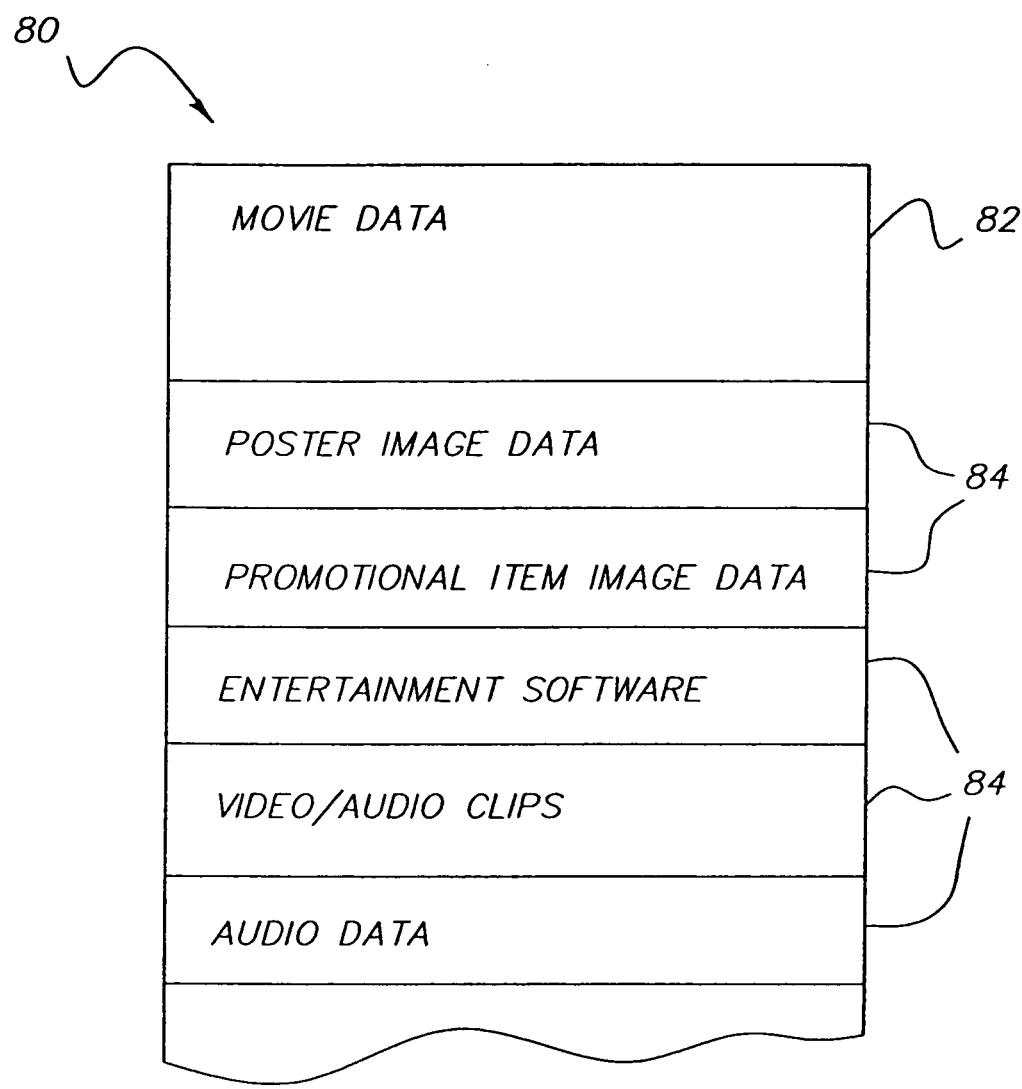
FIG. 4 is a block diagram showing major data components of an image data stream that provides the digital image data along with data for generating related promotional items.

Referring to FIG. 4, there is shown a block diagram of transmitted data 80 sent by studio 110 for a motion picture showing. Transmitted data 80 includes both a sizeable motion picture data component 82 and one or more supplemental data components 84 sent along with the motion picture data component 82. For example, supplemental data components 84 may be sent "via the same channel" or "in the same file" as the motion picture data component 82. In general, supplemental data components 84 differ from motion picture data component 82 in that the supplemental data is intended for uses other than those of motion picture display. In fact, the supplemental data can include images that are not displayed in the motion picture display, for example, promotional posters (which are a composite of text, graphics, and images related to the motion picture). Supplemental components 84 may include images, such as poster images or images suitable for printing onto apparel or coffee mugs, audio data, video data, or audio and/or images suitable for transmission to or from wireless handheld communication devices or entertainment software. Entertainment software might include game modules or interactive programs suited to the motion picture audience and theme, for example. Video materials may even include data for recording a DVD copy of the movie. Such a DVD copy may be of a pre-selected resolution and quality. Other supplemental data components 84 may include image data for printing CD or DVD labels. Wireless transmission of promotional item image data via hand-held communication devices such as cellular phones, mobile phones, smartphones, personal digital assistants, handheld gaming devices, pocket personal computers, and other like devices is contemplated as well.

Supplemental data components 84 may also include data and software for supporting sales of promotional items. For example, an advertisement for on-screen display can be provided, to be shown between scheduled showings, reminding the audience that various promotional items are available. Supplemental data components 84 software could also include various types of software utilities for tracking sales, print drivers for different recording apparatus 52, encoded instructions for machine operation, or operator instructions for using the data to fabricate promotional items. Tracking software could be used, for example, to monitor and report the generation of a promotional product formed at recording apparatus 52. In this way, each sale of a promotional item can be tracked to facilitate royalty payment, for example. A report can be transmitted electronically with each completed sale or can be compiled and stored for uploading when queried from a remote site, for example. Also, various password and key word protection schemes could be employed for allowing data to be recorded at the theater site. Password protection software or encoded security keys may be downloaded as part of supplemental data components 84.

It is instructive to note that supplemental data components 84 are generally intended for use with output devices or processors other than digital projector 150 (FIG. 3). As such, supplemental data components 84 are suitably formatted for their target output recording apparatus 52 and not for digital projector 150. For example, still and motion picture images, as well as audio data, would be arranged with the appropriate format for suitable output devices, which typically use lower resolution data and may employ an image format not usable for digital projector 150. Additionally, color gamut and/or tone scale may be appropriately adjusted for the output device.

Kiosk 50 for Selection and Customization

Figure 5:
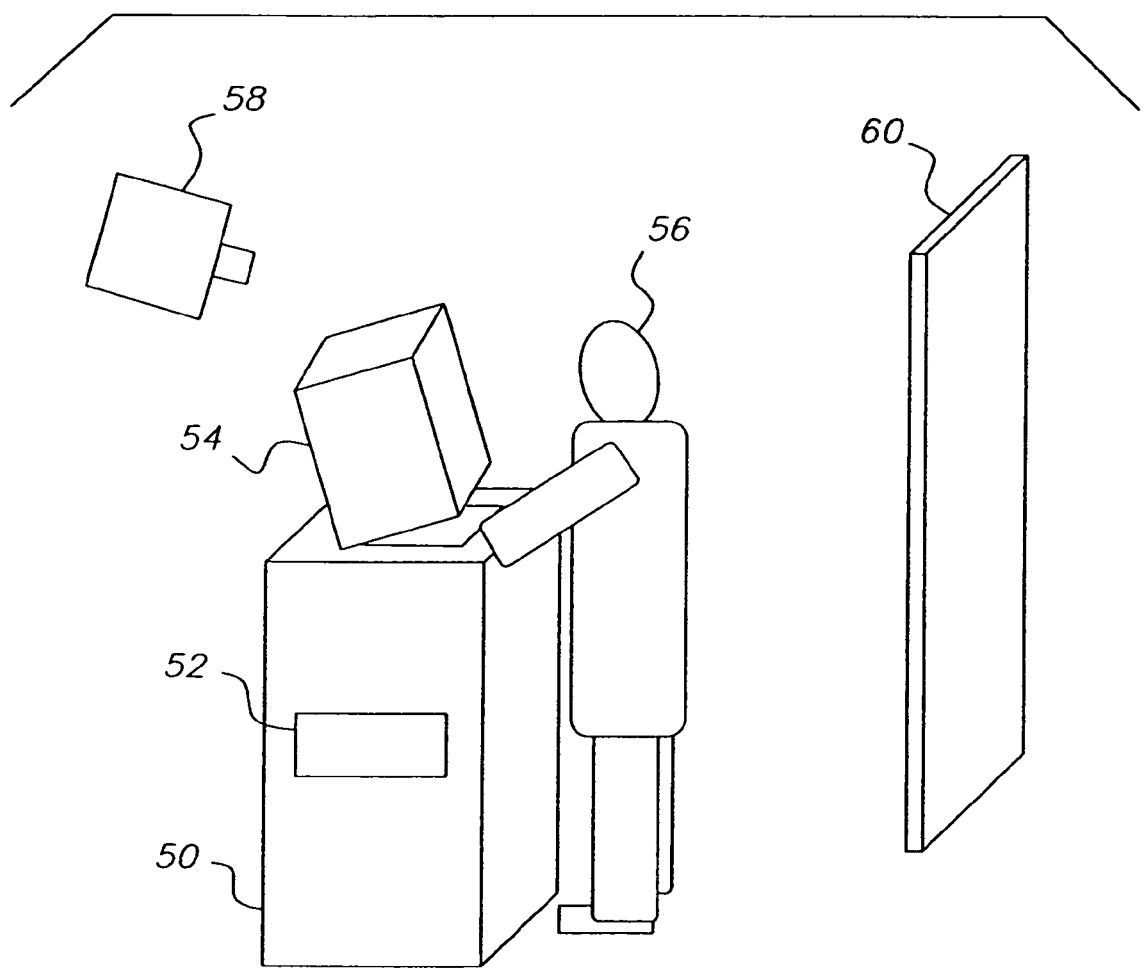
FIG. 5 is a block diagram of a kiosk for selection, payment, and customization, according to the present invention.
Figure 6:
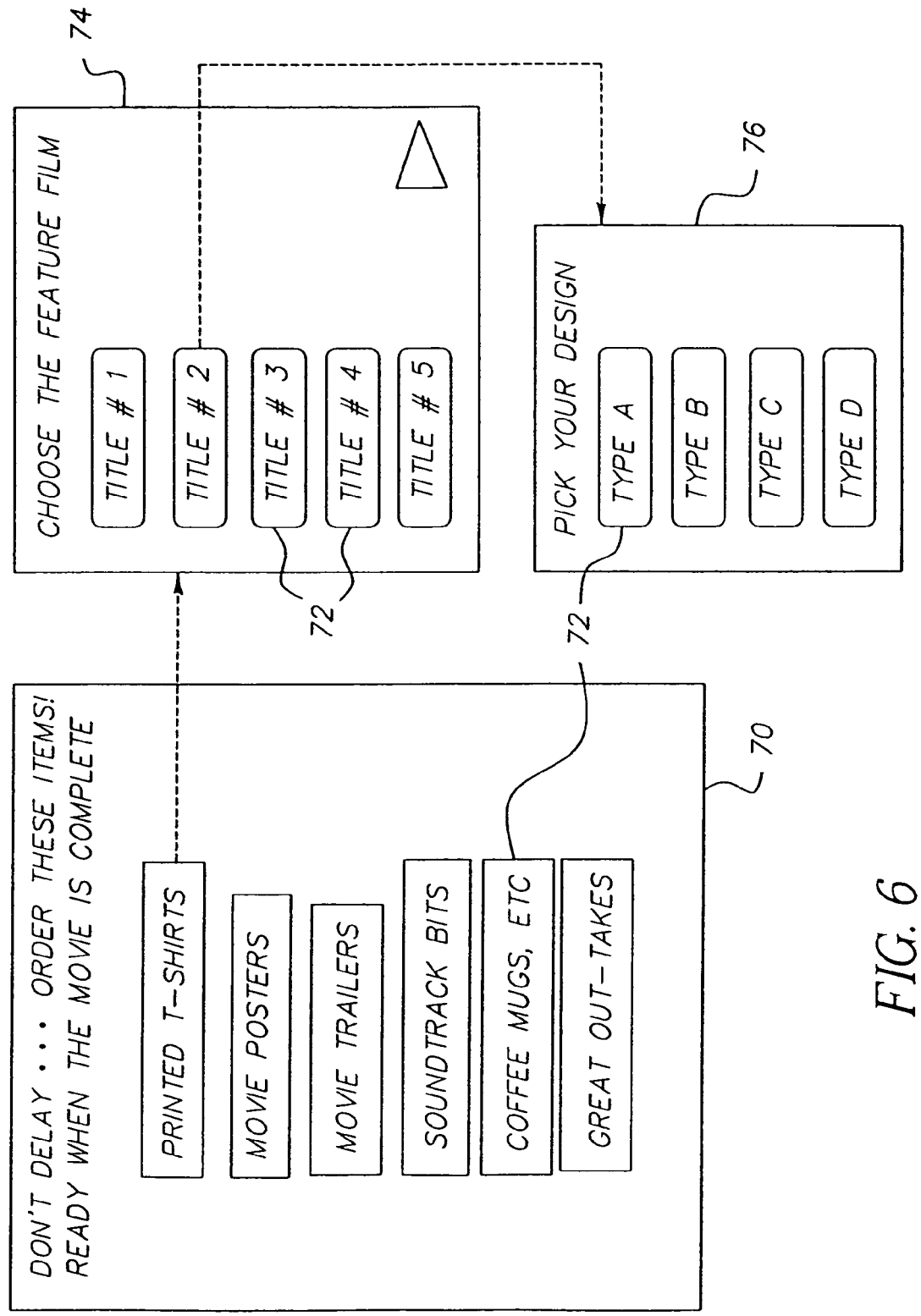
FIG. 6 is a plan view showing example interface screens provided on the kiosk.

Referring to FIG. 5, there is shown an arrangement of kiosk 50 in one embodiment. Kiosk 50 can be placed in the lobby at the theater site, and can be operated by a consumer 56 or by theater personnel. Kiosk 50 includes an interface terminal 54 that enables consumer 56 to order any of various promotional items that have been provided with the motion picture data. For example, interface terminal 54 may provide a touch screen menu of selections, as shown in the example screen sequence of FIG. 6. A main menu screen 70 lists options for ordering. The full set of available promotional items is extensive and may include such items as posters, coffee mugs, iron-on cloth patches and T-shirts of various design, CDs having one or more celebrity interviews, songs, or theme segments, or DVDs, for example. Consumer 56 makes a selection by pressing a touch screen button 72 and successively works through additional menu screens 74 and 76 to specify the promotional item ordered. Of course, there are many options for user interface design that would allow customers themselves to specify promotional item type and characteristics and also selections of specific content such as song titles or movie clips as would be familiar to one skilled in the user interface arts. In addition, kiosk 50 may provide non-copiable samples of various promotional items, allowing playback of various video or audio content, allowing a customer to order an item for later shipment. Wireless communication with the kiosk 50 is possible using known means such as Bluetooth™ and future equivalent wireless transmission means.

In other embodiments, kiosk 50 may serve as more than an order station. A camera 58 and display 60 may also be provided as part of the configuration of kiosk 50, allowing consumer 56 to obtain a custom image on a promotional item. For example, camera 58 may obtain an image of the face of consumer 56 for combination with a prepared background that may appear on display 60 or may be stored internally. This would enable consumer 56 to be placed within a scene or costume appropriate to the motion picture.

Transaction Handling

Coupling supplemental data components 84 to transmitted motion picture component 82 allows a number of possible arrangements for handling payment. In one embodiment, promotional items used directly as advertising, such as trailers, posters, or small portions of selected scenes or music themes, are printed onto DVD or CD at the theater site and are made available for free to all customers, or to customers who paid at the door, or to those who paid in advance. The expense of providing these items is then borne by studio 110 (FIG. 1) or by a distributor. This type of "free" advertising distributes, to the movie-going public, materials such as selected trailers for upcoming motion pictures.

In another embodiment, theater 28 pays a license fee for reprinting of promotional items from supplemental data component 84. Tracking software is also provided in order to maintain some measure of control in this printing arrangement. In one embodiment, tracking software permits the copying or printing of a limited number of promotional items; attempts to exceed these limits may lead to the requirement to purchase a more expensive license, for example. Tracking software can also be used to report the number of promotional items fabricated in order for studio 110 to obtain some percentage of the profits. Tracking software may contact the supplemental data provider each time an item is created via supplemental data component 84, or may accumulate a particular number of usages before contacting or being queried by the supplemental data provider.

Customer payment can also be obtained in a number of different ways. In one embodiment, consumer 56 pays directly at the kiosk with an electronic transaction, swiping a credit card through a reader after making an order, for example. Some items may be immediately available before or following a showing; others may be shipped to consumer 56 or available for pick-up at a later time. The ticket stub of consumer 56 can also be scanned in a reader to validate a special offer or to obtain an item paid for at the time of ticket purchase. A third-party ticket service, such as http://www.tickets.com, for example, may present a special offer that can be fulfilled by scanning a ticket or other printed item. In yet another embodiment the promotional items may be used as rewards for courtesy card holders. For example, a certificate for a poster may be awarded the customer who accumulates a certain number of courtesy card points. A bar code maybe printed on the ticket that can be scanned at the kiosk to receive the poster.

It can be appreciated that entertainment system 40 of the present invention provides the theater owner with a number of unique advantages for profit and can help to enhance the entertainment experience of consumer 56. The theater owner is not burdened with the task of storing and maintaining inventory of items that can only be profitably sold while a motion picture is shown at the site. For example, instead of ordering hundreds of T-shirts of various sizes for each movie being shown, the theater owner can stock a reasonable number of generic sized, blank T-shirts, ready for imaging, with whatever image the consumer wants. The consumer, meanwhile, has an opportunity to purchase a promotional item at the theater itself, before, during, or after the showing.

In addition to promotional items for sale, other types of promotional items could be provided in supplemental components 84. These might include, for example, brief audio or video clips for web transmittal by the theater owner to preferred customers. Image content for tickets and coupons could alternately be provided.

Supplemental component 84 need not necessarily be directly associated with the motion picture with which the data is sent. In one embodiment, images and audio for an upcoming "blockbuster" would be sent in advance, along with the motion picture image data for a different movie, to take advantage of early publicity opportunities.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, a person of ordinary skill in the art may implement portions of the present invention for "live" shows such as theater productions, circus productions, and skating productions.

PARTS LIST

10 Motion picture film distribution system
20 Studio
22 Content providers
24 Print film
26 Distribution network
28 Theater
30 Content films
40 Entertainment system
44 Network
46 Control logic processor
48 Large-format printer
50 Kiosk
52 Recording apparatus
54 Interface terminal
56 Consumer
58 Camera
60 Display
70, 74, 76 Menu screen
72 Touch screen button
80 Transmitted data
82 Motion picture component
84 Supplemental data component
100 Digital cinema preparation and distribution system
110 Studio
112 Film
114 Datacine system
116 Auxiliary input devices
118 Rendering system
120 Disk array
122 Transmitter
130 Transmission system
132 Magnetic medium
134 Optical medium
136 Fiber cable connection
138 Satellite
140 Exhibition system
142 Magnetic media reader
144 Optical media reader
146 Cinema operating system
148 Receiver 150 Digital projector

What is claimed is:

1. A method for providing, from digital data, at a motion picture exhibition site, a motion picture promotional item relating to a motion picture, the method comprising the steps of:
 (a) receiving motion picture digital data for the motion picture at the motion picture exhibition site, wherein the motion picture is a feature film and the motion picture digital data is suitable for presentation of the complete feature film to an audience at the motion picture exhibition site;
 (b) receiving supplemental data transmitted along with the motion picture digital data, the supplemental data to be used for forming the promotional item relating to the motion picture and including digital image data related to the motion picture and differing from the motion picture digital data;
 (c) storing the supplemental data in a computer readable digital storage device accessible from the motion picture exhibition site;
 (d) using an apparatus to form the promotional item at the motion picture exhibition site using the digital image data included in the supplemental data in response to a user command, wherein the promotional item is a physical object; and
 (e) providing the promotional item to the user at the motion picture exhibition site.

2. A method according to claim 1 wherein the promotional item is selected from the group consisting of a poster, a DVD, an audio recording, an item of apparel, a tattoo, a coupon, an eating utensil, a banner, and game software.

3. A method according to claim 1 further comprising the step of entering a password for use of the supplemental data.

4. A method according to claim 1 wherein the step of receiving motion picture digital data comprises the step of receiving the motion picture digital data on a magnetic medium, and the step of receiving the supplemental data comprises receiving the supplemental data together with the motion picture digital data on the same magnetic medium.

5. A method according to claim 1 wherein the step of receiving motion picture digital data comprises the step of receiving the motion picture digital data on an optical medium, and the step of receiving the supplemental data comprises receiving the supplemental data together with the motion picture digital data on the same optical medium.

6. A method according to claim 1 wherein the step of receiving motion picture digital data comprises the step of transferring the motion picture digital data over a network connection, and the step of receiving the supplemental data comprises transferring the supplemental data together with the motion picture digital data over the same network connection.

7. A method according to claim 1, further comprising the step of accepting the user command from a command entry console.

8. A method according to claim 1 further comprising the step of accepting payment for the promotional item by an electronic transaction.

9. A method according to claim 1 wherein the supplemental data comprises audio data.

10. A method according to claim 1 wherein the supplemental data comprises software.

11. A method according to claim 1 wherein the supplemental data comprises human-readable instructions.

12. A method according to claim 1 further comprising the step of providing the promotional item as a reward for accumulation of courtesy card points.

13. A method for providing, at a motion picture exhibition site, a promotional item related to a showing of a motion picture from digital data, the method comprising the steps of:
 (a) receiving motion picture digital data for the motion picture at the motion picture exhibition site, wherein the motion picture is a feature film and the motion picture digital data is suitable for presentation of the complete feature film to an audience at the motion picture exhibition site;
 (b) receiving supplemental data transmitted along with the motion picture digital data, the supplemental data to be used for forming the promotional item relating to the motion picture and including digital image data related to the motion picture and differing from the motion picture digital data;
 (c) storing the supplemental data in a computer readable digital storage device accessible from the motion picture exhibition site;
 (d) using an apparatus to form the promotional item relating to the motion picture at the motion picture exhibition site using the digital image data included in the supplemental data in response to a user command, wherein the promotional item is a physical object;
 (e) requesting the promotional item via a kiosk; and
 (f) providing the promotional item to the user at the motion picture exhibition site.

14. A method according to claim 13, wherein the promotional item is selected from the group consisting of a poster, a DVD, an audio recording, an item of apparel, a tattoo, a coupon, an eating utensil, a banner, and game software.

15. A method according to claim 13, further comprising the step of entering a password for use of the supplemental data.

16. A method according to claim 13 wherein the step of receiving motion picture digital data comprises the step of transferring the motion picture digital data over a network connection and the step of receiving the supplemental data comprises transferring the supplemental data together with the motion picture digital data over the same network connection.

17. A method according to claim 13 further comprising the step of accepting payment for the promotional item by an electronic transaction.

18. A system for providing a promotional item relating to a motion picture at a motion picture presentation site that includes:
 (a) a receiving logic processor for receiving a motion picture data stream including motion picture digital data for the motion picture, wherein the motion picture is a feature film and the motion picture digital data is suitable for presentation of the complete feature film to an audience at the motion picture exhibition site, and also including supplemental data to be used for forming the promotional item relating to the motion picture, the supplemental data including digital image data related to the motion picture and differing from the motion picture digital data,
 (b) a data storage means for storing the motion picture digital data and the supplemental data provided in the motion picture data stream;
 (c) a control logic processor for accepting an operator command to form the promotional item; and
 (d) a recording apparatus in communication with the control logic processor for obtaining the supplemental data and for forming the promotional item relating to the motion picture onto a recordable medium at the motion picture exhibition site using the digital image data included in the supplemental data according to the operator command, wherein the promotional item is a physical object.

19. A system according to claim 18 wherein the control logic processor comprises a touch screen interface.

20. A system according to claim 18 wherein the recording apparatus records onto an optical medium.

21. A system according to claim 18 wherein the recording apparatus records onto a magnetic medium.

22. A system according to claim 18 wherein the recording apparatus records onto an item of apparel.

23. A system according to claim 18 wherein the recording apparatus records onto a utensil.

24. A system according to claim 18 wherein the recording apparatus comprises a color printer.

25. A method for providing, at a motion picture exhibition site, a promotional item relating to a motion picture from digital data, the method comprising the steps of:
  (a) receiving motion picture digital data for the motion picture at the motion picture exhibition site, wherein the motion picture is a feature film and the motion picture digital data is suitable for presentation of the complete feature film to an audience at the motion picture exhibition site;
  (b) receiving supplemental data transmitted along with the motion picture digital data, the supplemental data to be used for forming the promotional item relating to the motion picture and including digital image data related to the motion picture and differing from the motion picture digital data;
  (c) storing the supplemental data in a computer readable digital storage device accessible from the motion picture exhibition site;
  (d) using an apparatus to form the promotional item relating to the motion picture at the motion picture exhibition site using the digital image data included in the supplemental data in response to a user command, wherein the promotional item is a physical object;
  (e) requesting the promotional item relating to the motion picture via a wireless handheld communication device and
  (f) providing the promotional item relating to the motion picture to the user at the motion picture exhibition site.

26. The method claimed in claim 25, wherein the handheld communication devices is selected from the group consisting of cellular phones, mobile phones, smartphones, personal digital assistants, handheld gaming devices, and pocket personal computers.

27. A method for producing a promotional item relating to a motion picture provided from a data stream, comprising:
  (a) transmitting, to a motion picture exhibition site, motion picture image data for the motion picture, wherein the motion picture is a feature film and the motion picture digital data is suitable for presentation of the complete feature film to an audience at the motion picture exhibition site together with supplemental data, wherein the supplemental data is used for forming the promotional item relating to the motion picture and wherein the supplemental data includes digital image data related to the motion picture and differing from the motion picture digital data;
  (b) storing the supplemental data at the motion picture exhibition site;
  (c) forming the promotional item relating to the motion picture onto a recordable medium at the motion picture exhibition site using the digital image data included in the supplemental data in response to a user command, wherein the promotional item is a physical object; and;
  (d) providing the promotional item to the user at the motion picture exhibition site.

28. A method according to claim 27 wherein the promotional item is taken from the group consisting of a poster, a DVD, an audio recording, an item of apparel, a tattoo, a coupon, an eating utensil, a banner, and game software.

* * * * *